March 21, 1967 A. C. A. SAUNDERS 3,310,474
NUCLEAR REACTOR FUEL ELEMENTS
Filed May 27, 1965 2 Sheets-Sheet 1

March 21, 1967 A. C. A. SAUNDERS 3,310,474
NUCLEAR REACTOR FUEL ELEMENTS
Filed May 27, 1965 2 Sheets-Sheet 2

United States Patent Office 3,310,474
Patented Mar. 21, 1967

3,310,474
NUCLEAR REACTOR FUEL ELEMENTS
Alan Charles Anthony Saunders, Ribbleton, Preston, England, assignor to United Kingdom Atomic Energy Authority, London, England
Filed May 27, 1965, Ser. No. 459,336
Claims priority, application Great Britain, July 23, 1964, 29,708/64
3 Claims. (Cl. 176—76)

This invention relates to nuclear reactor fuel elements.

Nuclear reactor fuel elements commonly comprise a fuel member or a stack of fuel members enclosed within a protective sheath. The sheath serves to preclude contact of nuclear reactor coolant with the fuel member whereby a chemical reaction would take place and also to retain fission products resulting from irradiation. A void is frequently provided within the sheath for the accumulation of the fission products and where a stack of fuel members such as uranium dioxide pellets is used it is known to include a helical coil spring in the void between the stack of fuel members and the end closure of the sheath. The spring serves to consolidate the stack of fuel members within the sheath during transit and to support the sheath against long term creep collapse under irradiation.

A nuclear reactor fuel element according to the invention comprises a stack of fuel members enclosed by a tubular sheath having end closures and a helical coil spring for consolidating the stack of fuel members so arranged in one end of the sheath that the reaction force of the helical coil spring is supported exclusively by the sheath.

The invention provides that the stack of fuel members can be assembled within the sheath and pre-loaded by the spring before offering up the adjacent end closure to the sheath thereby facilitating securing of the end closure to the sheath.

Figure 1:
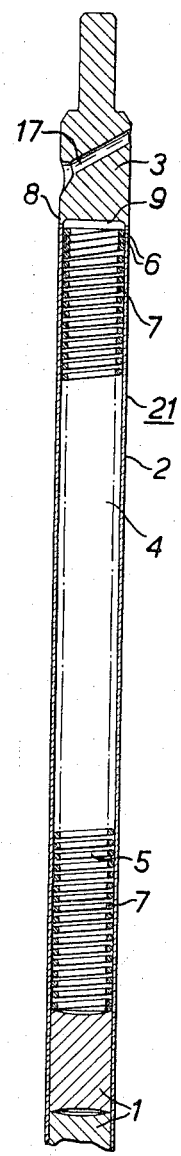
Figure 3:
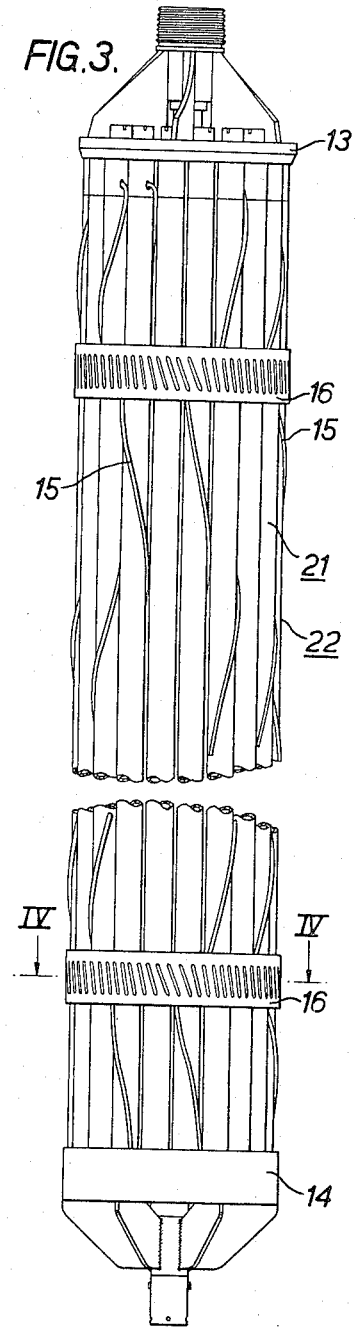
Figure 2:
Figure 4:
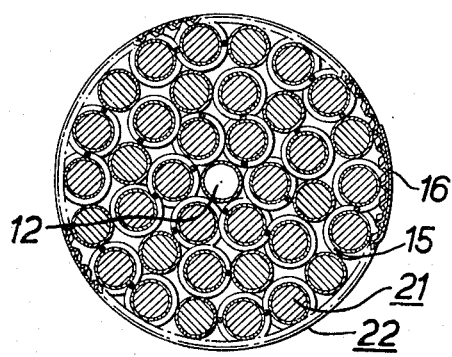
Figure 5:
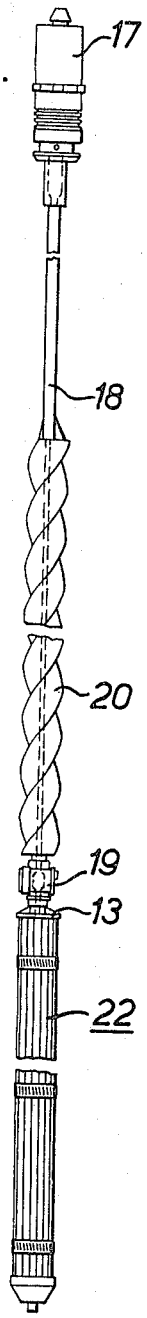

An embodiment of the invention will now be described, by way of example, with reference to the accompanying drawings wherein:

FIGURE 1 is a fragmentary side view in modial section, of a nuclear reactor fuel element, FIGURE 2 is an end view of a component of the fuel element of FIGURE 1, FIGURE 3 is a fragmentary side view of a cluster of fuel elements, FIGURE 4 is a plan view in section on line IV—IV of FIGURE 3, and FIGURE 5 is a fragmentary side view of a nuclear reactor fuel element stringer.

FIGURE 1 of the drawings shows a fragment of a fuel element 21 comprising a stack of fuel members 1 (two only of which are shown) enclosed by a tubular sheath 2 having an end closure 3. Between the stack of fuel members 1 and end closure 3 there is a void designated 4 wherein there is a helical coil compression spring 5. A group of two axially closed coils 6 at the end of the spring adjacent the end closure 3 are of greater diameter than the remaining axially open coils 7 and are gripped by the sheath, the remaining coils 7 being freely slidable. The end closure 3 has a skirt 8 by which the end closure is secured to the sheath by an electrical resistance butt weld. The spring is inserted within the sheath to an extent wherein the outer end coil of the group of coils 6 is spaced from the end of the sheath and the reaction of the spring is taken exclusively by the frictional engagement of the end coils 6 with the sheath so that no force is exerted on the end closure thereby facilitating welding. Because the spring is out of physical contact with the end closure by passing of electrical current during resistance welding of the joint faces is avoided.

FIGURE 2 shows an end view of the outermost coil 6 which is provided with a tongue 10. Assembly of the spring to the sheath is effected by entering the coils 7 into the sheath and, when the coils 6 abut the end of the sheath, applying a clockwise torque to the spring by means of the tongue 10 to wind up the coils 6 into a smaller diameter so that they will enter the sheath. Upon release the coils unwind and increase in diameter to grip the sheath.

Typically, the fuel element comprises a stack 12'-0" long of uranium dioxide pellets 1 of .570" diameter and .750" long enclosed within a zirconium-aluminium alloy sheath 2 having bore .575", wall thickness .025" and 12'-7½" long. The spring 5 has free length 14¼", two fully closed coils 6 of .602" diameter and seventy-seven coils 7 of .566" diameter. Spring loading is 14 lbs. at length 7½".

The fuel element 21 is intended for use in a cluster 22 of fuel elements in spaced parallel array as shown in FIGURES 3 and 4. A cluster 21 comprises thirty-six fuel elements 21 arranged on four concentric pitch circles and includes a central hollow tube 12. The fuel elements are end located by grids 13, 14 the elements being secured to the grid 13 which thereby controls the cluster geometry. The elements are slidably guided by the grid 14 to compensate for thermal expansion. Spacing of the elements intermediate their length is controlled by helically wound wires 15 on twenty-four of the elements and intermediate bracing is effected by external bands 16. One end of the wire 15 of each fuel element is secured in a penetration 17 (FIGURE 1) of the end closure 3 and the other end in a similar penetration of the end closure (not shown) at the opposite end of the fuel element.

In use in a nuclear reactor, the cluster 22 of fuel elements 21 is intended to be suspended within a vertical channel from a seal plug 17 (FIGURE 5) at the upper end of the channel (not shown) by a suspending member 18. The suspending member 18 is tubular and is adapted by a coupling 19 for attachment to the grid 13. Intermediate its length, the suspending member 18 has a helically finned neutron shield plug 20 which prevents streaming of neutrons along the channel but enables flow of reactor coolant.

I claim:

1. A nuclear reactor fuel element comprising a tubular sheath,
    end closures for said sheath,
    a stack of fuel members contained within said sheath,
    a helical coil spring bearing at one end against the sheath short of the adjacent end closure and at the other end against one of the fuel members for consolidating said stack of fuel members in one end of said sheath.

2. A nuclear reactor fuel element according to claim 1, wherein said spring includes a group of at least two coils disposed at the end of the spring which is remote from said stack of fuel members and said group of coils is of an unstressed diameter greater than the adjacent diameter of the sheath so as to be gripped by the sheath.

3. A nuclear reactor fuel element according to claim 2, wherein one of said end closures is secured to the sheath at the end adjacent the spring by an electrical resistance butt weld and the outer end coil of said group of coils is spaced from the end of the sheath.

References Cited by the Examiner
UNITED STATES PATENTS
3,022,240    2/1962    Bassett _____ 176—74 X CARL D. QUARFORTH, *Primary Examiner.*
BENJAMIN R. PADGETT, *Examiner.*
M. J. SCOLNICK, *Assistant Examiner.*